May 13, 1952 J. S. WHITMOYER 2,596,831
NAIL PULLER
Filed Jan. 19, 1949
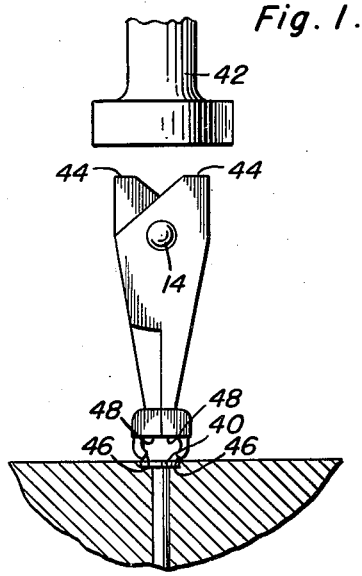
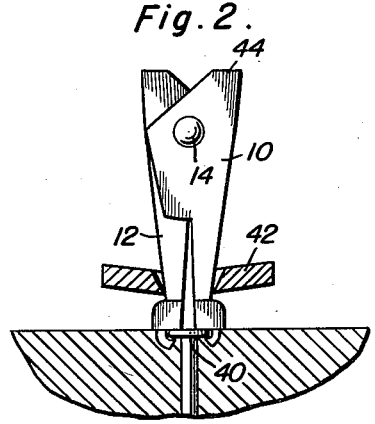
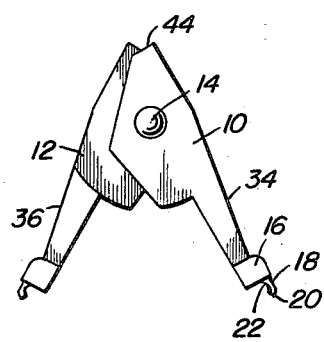
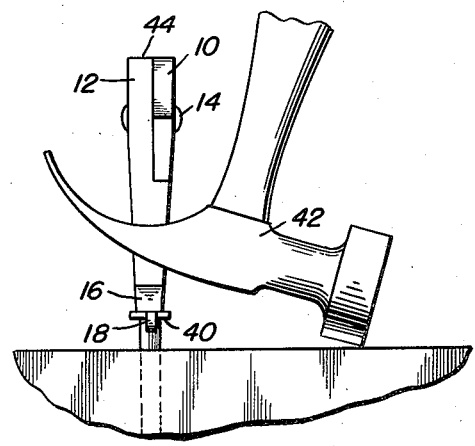
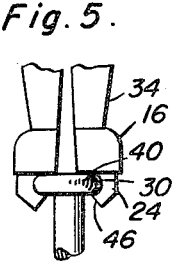
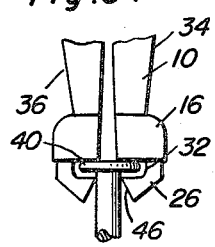
Joshua S. Whitmoyer
INVENTOR.

Patented May 13, 1952

2,596,831

UNITED STATES PATENT OFFICE 2,596,831

NAIL PULLER

Joshua S. Whitmoyer, Watsontown, Pa.

Application January 19, 1949, Serial No. 71,684

2 Claims. (Cl. 254—23)

This invention relates to novel and useful improvements in tools or attachments particularly for use in the carpentry trade.

An object of this invention is to pull nails having their heads adjacent or embedded in a material such as wood by passing a pair of nail head engaging members in the region adjacent the head but slightly therebeneath and then squeezing the nail head engaging members together through the utility of a clawed instrument or tool such as a hammer, crowbar, etc., the squeezing action taking place by having the claws disposed against sloping sides of the shanks which have the nail engaging members thereon and then operating the clawed hammer or crowbar in the usual manner for nail pulling.

Another object of this invention is to perform the above mentioned function by means of an improved simplified structure which includes a pair of shanks pivoted together adjacent one end having the necessary sloping sides, the nail engaging members at the bottom ends thereof, and a hammering or tapping surface at the opposite pair of ends of said shanks.

Ancillary objects and features of novelty will become apparent to those skilled in the art, in following the description of the preferred forms of the invention, illustrated in the accompanying drawings, wherein:

Figure 1 is an elevational side view of one form of the invention, showing the same in position for tapping or hammering so that the nail engaging members may be disposed in the proper position with respect to the nail head;

Figure 2 is an elevational view of the device shown in Figure 1, showing a second operative position, that is, showing the clawed tool having the nail head engaging members partially squeezed thereunder;

Figure 3 is an elevational view of the device shown in Figures 1 and 2, showing the nail being pulled from the nail retaining material;

Figure 4 is an elevational view of the device shown in the previous figures, illustrating particularly the appearance of the device when the pivoted shanks are spread with respect to each other;

Figure 5 is a fragmentary elevational view of another form of the invention, the differentiating feature being the shape of the nail head engaging members for accommodation of a different type of nail; and Figure 6 is an elevational view showing another form of the invention differentiating from the previous forms in the actual shape of the nail head engaging members.

The present invention relates to an attachment or tool whereby, upon utility thereof, the task of removing nails which are embedded or partially embedded (the heads thereof) in any material such as wood, fiber board, and others, is lightened.

A pair of shanks 10 and 12, respectively, are pivoted together adjacent one pair of ends thereof by means of a pivot pin 14. Noting Figure 3, it is apparent that the shanks 10 and 12 have recessed portions which interfit, thereby rendering the general outside dimensions of the lower parts of the shanks and the upper parts of the combined shanks substantially identical.

At the bottom end of each shank there is supplied an enlarged portion 16 which has a nail head engaging member 18 disposed thereon. This may be formed integral with the enlarged portion 16 or affixed thereto by any suitable means, such as welding, brazing, or the like. The nail-engaging member has a sharpened end 20 and a recess 22 in one lateral surface. Hence, since there are two of such assemblies provided, one on each shank, they cooperate for engagement beneath a nail head as shown in Figure 2.

Viewing Figures 5 and 6, it will be seen that the nail head engaging portions or members 24 and those seen at 26 differ in the size and shape of the recesses 30 and 32, respectively. Hence, for different types and sizes of nails, different tools may be utilized.

The outer side edges or surfaces 34 and 36, respectively, of the shanks 10 and 12 are tapered toward each other at such time when the inner side edges of the same shanks are substantially parallel.

Operation

First the device is disposed adjacent a nail head 40 as seen in Figure 1. A tool such as a hammer 42 may then be used to tap the hammering surfaces 44 provided at the end of each shank opposite the ends accommodating the nail-engaging members. This spreads the shanks apart due to the action of the cam surfaces 46 provided on each nail head engaging member.

After the tool is tapped far enough so that the top surface of the nail head engages the stops or the stop surfaces 48 formed at the bottom of the enlargements 16 (Figure 2), the claws of the clawed tool are placed on the inclined surfaces 34 and 36.

By moving the hammer, crowbar or other clawed instrument rotationally about a pivot point as is conventional, the claws cooperating with the inclined surfaces form the necessary wedge action to close the nail engaging members beneath the nail head. Further movement of the conventional tool will lift the nail as well as the nail puller.

It is apparent that variations may be made without departing from the spirit of the invention.

Having described the invention, what is claimed as new is:

1. A nail puller comprising a pair of shanks, means pivoting said shanks to each other, members fixed to one pair of ends of said shanks for engagement beneath a nail head, said shanks having tapered sides for engagement with a clawed tool and having tool claw accommodating surfaces in planes parallel to the axis of said pivot means, hammering surfaces at the opposite pair of ends of said shanks, and said members being narrower than said shanks and having sharp leading edges for penetration of the material having the nail therein.

2. For use in pulling nails having heads adjacent or embedded in a material, a tool comprising a pair of shanks pivoted together and having confronting sides when said shanks are pivoted together, at which time the opposite sides taper toward each other to form a wedge outer surface for accommodation of a clawed tool to press said shanks together and to lift said shanks, nail engaging members at one pair of ends of said shanks, and hammering surfaces at the opposite ends of said shanks.

JOSHUA S. WHITMOYER.

REFERENCES CITED

The following references are of record in the file of this patent:

UNITED STATES PATENTS

| Number | Name | Date |
| --- | --- | --- |
| 445,077 | Pettengill | Jan. 20, 1891 |
| 667,663 | Alliger | Feb. 12, 1901 |
| 830,072 | Houlihan | Sept. 4, 1906 |
| 1,235,986 | McLeod | Aug. 7, 1917 |

FOREIGN PATENTS

| Number | Country | Date |
| --- | --- | --- |
| 274,529 | Germany | May 23, 1914 |